(12) United States Patent
Wurcker et al.

(10) Patent No.: US 10,439,797 B2
(45) Date of Patent: *Oct. 8, 2019

(54) METHODS AND DEVICES AGAINST A SIDE-CHANNEL ANALYSIS

(71) Applicant: ESHARD, Martillac (FR)

(72) Inventors: Antoine Wurcker, Villenave D'Ornon (FR); Hugues Thiebeauld de la Crouee, Pessac (FR)

(73) Assignee: ESHARD, Martillac (FR)

(*) Notice: Subject to any disclaimer, the term of this patent is extended or adjusted under 35 U.S.C. 154(b) by 171 days.

This patent is subject to a terminal disclaimer.

(21) Appl. No.: 15/636,247

(22) Filed: Jun. 28, 2017

(65) Prior Publication Data

US 2017/0373832 A1    Dec. 28, 2017

(30) Foreign Application Priority Data

Jun. 28, 2016   (EP) ..................................... 16176716
Jun. 28, 2016   (EP) ..................................... 16176717
(Continued)

(51) Int. Cl.
*H04L 9/00*   (2006.01)
*H04L 9/06*   (2006.01)
(Continued)

(52) U.S. Cl.
CPC ................ *H04L 9/002* (2013.01); *G09C 1/00* (2013.01); *H04L 9/0631* (2013.01);
(Continued)

(58) Field of Classification Search
CPC ..... H04L 9/002; H04L 9/0631; H04L 9/0861; H04L 9/14; G09C 1/00
See application file for complete search history.

(56) References Cited

U.S. PATENT DOCUMENTS 6,278,783 B1    8/2001  Kocher et al.
8,625,780 B2    1/2014  Peter et al.
(Continued)

FOREIGN PATENT DOCUMENTS

EP    1267514 A2   12/2002
EP    1601132 A1   11/2005
(Continued)

OTHER PUBLICATIONS

Extended European Search Report from EP Appn. No. 16176714.0, dated Jan. 3, 2017, 6 pages.
(Continued)

*Primary Examiner* — Oleg Korsak
(74) *Attorney, Agent, or Firm* — Brake Hughes Bellermann LLP

(57) ABSTRACT

A method for executing by a circuit a bit permutation operation by which bits of an input data are mixed to obtain an output data including at least two words, may include: generating a mask set including mask parameters, the mask set having one word column per word of the input data; generating an input set by combining the input data with each mask parameter of the mask set by Exclusive OR (XOR) operations; and computing an output set including output data resulting from the application of the bit permutation operation to each data in the input set, where the mask set may be generated such that the output set includes columns of output words, and each word column of the mask set an the output set including a same number of occurrences of all possible values of one input data word and respectively one output word.

22 Claims, 8 Drawing Sheets

(30) Foreign Application Priority Data

Jun. 28, 2016 (EP) .................................... 16176718
Jun. 28, 2016 (EP) .................................... 16176719
Jun. 28, 2016 (EP) .................................... 16176721

(51) Int. Cl.
*H04L 9/08* (2006.01)
*H04L 9/14* (2006.01)
*G09C 1/00* (2006.01)

(52) U.S. Cl.
CPC .............. *H04L 9/0861* (2013.01); *H04L 9/14* (2013.01); *H04L 2209/04* (2013.01); *H04L 2209/08* (2013.01); *H04L 2209/12* (2013.01)

(56) References Cited

U.S. PATENT DOCUMENTS

| | | | |
|---|---|---|---|
| 2001/0053220 A1 | 12/2001 | Kocher et al. | |
| 2005/0259814 A1 | 11/2005 | Gebotys | |
| 2006/0056622 A1 | 3/2006 | Liardet et al. | |
| 2007/0076890 A1 | 4/2007 | Muresan et al. | |
| 2007/0160196 A1 | 7/2007 | Timmermans | |
| 2008/0019503 A1 | 1/2008 | Dupaquis et al. | |
| 2008/0240443 A1 | 10/2008 | Vuillaume et al. | |
| 2009/0074181 A1 | 3/2009 | Pelletier | |
| 2012/0250854 A1 | 10/2012 | Danger et al. | |
| 2014/0351603 A1 | 11/2014 | Feix et al. | |
| 2015/0169904 A1 | 6/2015 | Leiserson et al. | |
| 2016/0269175 A1* | 9/2016 | Cammarota | G09C 1/00 |
| 2017/0104586 A1 | 4/2017 | Hars | |
| 2017/0244552 A1 | 8/2017 | Thiebeauld De La Crouee et al. | |
| 2017/0373829 A1 | 12/2017 | Wurcker et al. | |
| 2017/0373832 A1 | 12/2017 | Wurcker et al. | |
| 2017/0373838 A1 | 12/2017 | Wurcker et al. | |

FOREIGN PATENT DOCUMENTS

| | | |
|---|---|---|
| GB | 2443355 A | 4/2008 |
| WO | 0108012 A1 | 2/2001 |

OTHER PUBLICATIONS

Extended European Search Report from EP Appn. No. 16176717.3, dated Jan. 3, 2017, 6 pages.
Extended European Search Report from EP Appn No. 16176721.5, dated Jan. 3, 2017, 7 pages.
Extended European Search Report from EP Appn. No. 16176716.5, dated Jan. 3, 2017, 7 pages.
Extended European Search Report from EP Appn No. 16176719.9, dated Jan. 5, 2017, 8 pages.
Extended European Search Report from EP Appn. No. 16176718.1, dated Dec. 22, 2016, 9 pages.
Bruneau, Nicolas , et al., "Multi-Variate Higher-Order Attacks of Shuffled Tables Recomputation", http:// eprint.iacr.org/2015/837.pdf, retrieved May 9, 2016, 20 pages.
Coron, Jean-Sebastien , "Higher Order Masking of Look-up Tables", International Association for Cryptologic Research, vol. 2014025:092212, Feb. 5, 2014, 22 pages.
Herbst, Christoph , et al., "An AES Smart Card Implementation Resistant to Power Analysis Attacks", Applied Cryptography and Network Security Lecture Notes in Computer Science; LNCS, Jan. 1, 2006, 14 pages.
Itoh, Kouichi , et al., "DPA Countermeansure Based on the "Masking Method"", ICICS 2001, LNCS 2288, 2002, pp. 440-456.

* cited by examiner

Fig. 6

IPT

| IPTL | | | | | | | | IPTR | | | | | | | |
|---|---|---|---|---|---|---|---|---|---|---|---|---|---|---|---|
| 60 | 62 | 14 | 16 | 28 | 40 | 50 | 54 | 59 | 61 | 13 | 15 | 27 | 39 | 49 | 53 |
| 6 | 4 | 24 | 18 | 56 | 38 | 52 | 58 | 5 | 3 | 23 | 17 | 55 | 37 | 51 | 57 |
| 2 | 20 | 64 | 42 | 34 | 32 | 44 | 46 | 1 | 19 | 63 | 41 | 33 | 31 | 43 | 45 |
| 8 | 36 | 22 | 10 | 26 | 48 | 12 | 30 | 7 | 35 | 21 | 9 | 25 | 47 | 11 | 29 |

PEXT

| 25 | 16 | 7 | 20 | 21 | 29 |
|---|---|---|---|---|---|
| 21 | 29 | 12 | 28 | 17 | 1 |
| 17 | 1 | 15 | 23 | 26 | 5 |
| 26 | 5 | 18 | 31 | 10 | 2 |
| 10 | 2 | 8 | 24 | 14 | 32 |
| 14 | 32 | 27 | 3 | 9 | 19 |
| 9 | 19 | 13 | 30 | 6 | 22 |
| 6 | 22 | 11 | 4 | 25 | 16 |

Fig. 7

FPT

| 49 | 17 | 42 | 10 | 41 | 9 | 57 | 25 | 60 | 28 | 63 | 31 | 35 | 3 | 36 | 4 |
|---|---|---|---|---|---|---|---|---|---|---|---|---|---|---|---|
| 44 | 12 | 50 | 18 | 59 | 27 | 43 | 11 | 61 | 29 | 37 | 5 | 64 | 32 | 54 | 22 |
| 53 | 21 | 58 | 26 | 46 | 14 | 38 | 6 | 52 | 20 | 55 | 23 | 56 | 24 | 62 | 30 |
| 39 | 7 | 47 | 15 | 40 | 8 | 45 | 13 | 48 | 16 | 33 | 1 | 34 | 2 | 51 | 19 |

Fig. 8

METHODS AND DEVICES AGAINST A SIDE-CHANNEL ANALYSIS

CROSS REFERENCE TO RELATED APPLICATIONS

This application claims priority to European Application Numbers, EP16176716.5, EP16176717.3, EP16176718.1, EP16176719.9, EP16176721.5, each filed Jun. 28, 2016, the disclosures of which are incorporated herein by reference.

TECHNICAL FIELD

The present disclosure relates to methods and devices for protecting a circuit or a program against side channel analysis and providing a value of a secret data handled by the circuit or program, and in particular a circuit for transforming a message by an encryption or decryption algorithm using a secret key.

The present disclosure also relates to devices implementing a cryptographic algorithm, such as secure devices (smart card integrated circuits), hardware cryptographic components integrated onto mother boards of computers and other electronic and IT equipment (USB drives, TV decoders, game consoles, etc.), or the like.

The present disclosure also relates to circuits implementing a cryptographic algorithm such as AES (Advanced Encryption Standard) or DES (Data Encryption Standard). The present disclosure also relates to a program implementing such an algorithm, provided for being executed in a secure or non-secured environment.

The present disclosure also relates to circuits and software implementing a permutation operation permuting bits of a data which is required to be kept hidden.

BACKGROUND

Circuits implementing cryptographic algorithms can include a central processing unit (CPU), and a circuit dedicated to cryptographic computing, for example a cryptographic coprocessor. These circuits can include thousands of logic gates that switch differently according to the operations executed. These switches create short variations in current consumption, for example of a few nanoseconds, and those variations can be measured. In particular, CMOS-type integrated circuits include logic gates that only consume current when they switch, i.e. when a logic node changes its state to 1 or to 0. Therefore, the current consumption depends on data handled by the central processing unit CPU and on its various peripherals: memory, data flowing on data or address bus, cryptographic co-processor, etc.

Furthermore, certain software programs using encryption or obfuscation techniques, such as the White-box Cryptography technique, may integrate secret data in such a way that it is very difficult to determine data by reverse engineering. Certain software programs may also receive a secret data from outside through a secure communication channel.

Such circuits may be subjected to so-called side channel analysis attacks based on observing current consumption, magnetic and/or electromagnetic radiation. Such attacks provide secret data, in particular encryption keys. Current side channel attacks implement statistical analysis methods such as SPA ("Single Power Analysis"), DPA ("Differential Power Analysis"), CPA ("Correlation Power Analysis") or EMA ("ElectroMagnetic Analysis"). SPA analysis normally only requires the acquisition of a single current consumption trace. SPA analysis obtain information about the activity of the integrated circuit by observing the part of the current consumption trace corresponding to a cryptographic computation, since the current consumption trace varies according to the operations executed and the data handled. Software may also undergo such side channel attacks during its execution by a circuit.

DPA and CPA analyses enable the key of an encryption algorithm to be found by acquiring numerous circuit consumption traces and by statistically analyzing these traces to find a target information. DPA and CPA analyses can be based on the premise that the consumption of a CMOS-type integrated circuit varies when a bit changes from 0 to 1 in a register or on a bus, and does not vary when a bit remains equal to 0, remains equal to 1 or changes from 1 to 0 (discharge of a stray capacitance of a MOS transistor). Alternatively, the consumption of a CMOS-type integrated circuit varies when a bit changes from 0 to 1 or changes from 1 to 0 and does not vary when a bit remains equal to 0 or remains equal to 1. This second hypothesis enables the conventional "Hamming distance" or "Hamming weight" functions to be used in order to develop a consumption model that does not require knowledge of the structure of the integrated circuit in order to be applicable. DPA analysis involves amplifying this consumption difference using statistical processing on numerous current consumption traces, aiming to highlight a measurement difference between two types of current consumption traces distinguished according to formulated hypotheses.

CPA analysis is based on a linear current consumption model and involves computing a correlation coefficient between, firstly, the consumption points measured that form the captured consumption traces and, secondly, an estimated consumption value, computed from a linear consumption model and a hypothesis on data to be discovered that is handled by the microcircuit and on the value of the encryption key.

Electromagnetic analysis (EMA) is based on the principle that an integrated circuit may send information in the form of near or far field electromagnetic radiation. Given that transistors emit electromagnetic signals when their state changes, these signals can be treated like the current consumption variation signals by an analysis such as one or other of the SPA, DPA and CPA analyses.

Other side channel analyses exist, such as "Template analysis" and "Mutual Information Analysis" (MIA)). All of the above-mentioned analyses are based on a time alignment of all the analyzed traces. In other words, all the measurements performed at a given time, e.g., from the time the execution of a command is activated by the circuit, must correspond to the same data handled by the algorithm.

SUMMARY

In one general aspect, a method for executing by a circuit a bit permutation operation by which bits of an input data are mixed to obtain an output data including at least two words, may include: generating a first mask set including mask parameters, where the mask set including one word column per word of the input data, each word column including a same number of occurrences of all possible values of one input data word in relation to a size of the input data word, and computing an output set including output data resulting from the application of the bit permutation operation to each data in an input set including data resulting from the combination of the input data with each mask parameter of the first mask set by Exclusive OR (XOR) operations, where the first mask set being generated such that the output set includes columns of output words, each output word column including a same number of occurrences of all possible values of one output word in relation to a size of the output word.

Implementations can include one or more of the following features. For exmaple, the generation of the first mask set includes: generating a first word column of the first mask set, including a single occurrence of all possible values of a word of the first word column in relation to a size of the word of the first word column; and computing each other column of the first mask set by applying a respective function to each of the words of the first column, the functions being defined such that the application of the bit permutation operation to the first mask set provides a mask output set including columns of words, each including a same number of occurrences of all possible values of one word of the mask output set column in relation to the size of the word of mask output set column.

In some implementations, the first word column of the mask set is randomly generated. The bit permutation operation includes duplicating bits of the input data.

In some implementations, a cryptographic algorithm conforming with Data Encryption Standard (DES) algorithm, may include, successively, a first bit permutation operation including a DES bit expansion operation, and performed using the first mask set, a substitution operation performed using masked substitution tables, each substitution table using as an input mask one mask parameter of the first mask set transformed by the first bit permutation operation, and as an output mask, a corresponding mask parameter of a second mask set, transformed by a second bit permutation operation, and the second bit permutation operation which includes a DES round permutation operation, and being performed using the second mask set, the first mask set being generated such that an output set of the first bit permutation operation includes columns of words, each column including a same number of occurrences of all possible values of the output set words in relation to a size of the output set words, the second mask set being generated such that: when combined by XOR operations with respective first masks of the first mask set, the second mask set provides a mask output set wherein each columns of the output set includes a single occurrence of all possible values of a word of the mask output word column in relation to a size of the word of the masked output word column, and an inverse of the second bit permutation operation provides an output set including columns of words, each column including a same number of occurrences of all possible values of one output set word in relation to a size of the output set word.

In some implementations, the generation of the first and second mask sets may include: generating a first word column of the first mask set, including a single occurrence of all possible values of a word of the first word column in relation to a size of the word of the first word column; computing a first word columns of the second mask set, by applying a first function to the first word column of the first mask set; computing each other column of the first mask set and the second mask set, by applying respective second bit permutation functions to each of the words of the first column of the first mask set, and of the first column of the second mask set, the bit permutation functions being defined such that: the first bit permutation operation applied to the first mask set, provides a first mask output set including columns of words, each including a same number of occurrences of all possible values of one word of the first mask output set column in relation to the size of the word of the first mask output set column, the second bit permutation operation applied to the second mask set, provides a second mask output set including columns of words, each including a same number of occurrences of all possible values of one word of the second mask output set column in relation to the size of the word of second mask output set column, a combination by XOR operations of each word column of the first mask set with a respective word column of the second mask set, provides a resultant column including a single occurrence of all possible values of one word of the resultant column in relation to a size of the word of the resultant column.

In another general aspect, the method may include an operation combining by XOR operations a first and a second round data to provide a round output data, the operation being applied to combine each data of a first round set including the first round data, with each data of a second round set including the second round data at a same rank, the first and second round sets including word columns, each word column including a same number of occurrences of all possible values of one word of the word column in relation to the size of the word of the word column, an output set of the operation being arranged in rows and columns, each row or column including output data resulting from the application of the operation to a same one data of one of the first or second input set and to all data of the other of the first and second input set, the method including selecting a data column of the output set including the round output data, the data column including word output columns, each output column including a same number of occurrences of all possible values of one word of the word output column, in relation to the size of the word in the word output column.

BRIEF DESCRIPTION OF THE DRAWINGS

The method and/or device may be better understood with reference to the following drawings and description. Non-limiting and non-exhaustive descriptions are described with the following drawings. In the figures, like referenced signs may refer to like parts throughout the different figures unless otherwise specified.

FIGS. 6 to 8 are tables used in DES encryption algorithm of FIG. 5;

DETAILED DESCRIPTION

In view of the drawbacks and considerations noted above, it may be desirable to propose a protection for an integrated circuit or a software program against one or more of side channel analyses. In particular, it may be desirable to propose a protection for a bit permutation operation involved in DES algorithm.

For instance, such circuits against side channel analysis may be described in French Patent application no. FR16 51443 filed on Feb. 22, 2016 by Applicant, which discloses a method for analysing traces representative of the activity of a circuit when the latter executes an operation successively on different input data. This method may include extracting a part of each trace, and generating a histogram from each extracted trace part, by counting an occurrence number of each possible value appearing in each of the extracted parts of these traces. Partial results of the operation may then be computed by applying the operation to each input data and each possible value of a part of a secret key involved in the operation. The method may then identify for each possible part value of the secret key, all the input data which provide the same partial result. For each possible part value of the secret key, the occurrence numbers in the histograms, corresponding to the identified input data and the part value of the secret key may then be added. The part of the secret key can be determined by subjecting the added occurrence numbers to a statistical analysis. The statistical analysis may assume that if a value related to the secret key has leaked in the extracted parts of the traces, it can be highlighted by the added occurrence numbers.

Example embodiments may relate to a method for encrypting or decrypting an input data according to a cryptographic algorithm including a bit permutation operation, wherein the bit permutation operation is performed according to methods described herein.

Example embodiments may also relate to a cryptographic algorithm conforming with Data Encryption Standard (DES) algorithm, and/or a bit permutation operation including a DES reverse permutation operation combined with a DES bit expansion operation.

Example embodiments may also relate to a circuit including a processor and configured to implement the methods defined herein.

one circuit performing a substitution operation for each masked substitution table.

Embodiments may also relate to a computer program product loadable into a computer memory and including code portions which, when carried out by a computer, configure the computer to carry out the steps of the above-defined methods.

Figure 1:
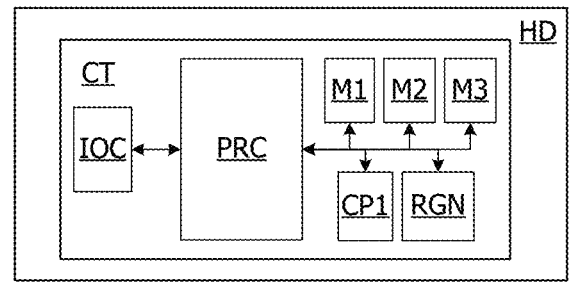
FIG. 1 illustrates a conventional architecture of a secure circuit.

FIG. 1 illustrates a secure integrated circuit CT, for example arranged on a portable medium HD such as, for example, a plastic card or any other medium, or in a terminal, such as a mobile terminal. The integrated circuit CT can include a microprocessor PRC, an input/output circuit IOC, memories M1, M2, M3 coupled to the microprocessor by a data and address bus and, optionally, a cryptographic computation co-processor CP1 or arithmetic accelerator, and/or a random number generator RGN. The memories M1, M2, M3 can include a volatile memory M1, for example a RAM-type ("Random Access Memory") memory containing volatile application data, a non-volatile a non-volatile memory M2, for example an EEPROM or Flash memory, containing non-volatile data and application programs, and possibly a read-only memory M3 (or ROM memory) containing the operating system of the microprocessor. The operating system can be also stored in the non-volatile memory M2.

The communication interface circuit IOC may be of contact type, for example according to the ISO/IEC 7816 standard, of contactless type with inductive coupling, for example according to the ISO/IEC 14443A/B or ISO/IEC 13693 standard, of contactless type by electrical coupling (UHF interface circuit), or of both contact and contactless type. The interface circuit IOC may also be coupled through a specific interface, to another circuit such as an NFC (Near-Field Communications) controller, or a main circuit of a terminal such as a mobile terminal or a connected object.

In some implementations, the integrated circuit CT may be configured to execute operations of encrypting, decrypting and/or signing messages that are sent to the integrated circuit CT using a cryptographic function. This cryptographic function may be executed by the processor PRC of the circuit CT or partially or totally executed by the processor PRC to the co-processor CP1.

As described herein, "word" designates a group of bits in a data, and "word column" designates a subset in a data set including a single word from all data in the data set, all the words in the word column having the same size. The words forming a word column are not necessary aligned, i.e., do not necessary includes the same bit positions in the data of the data set.

Example embodiments as described herein propose protection methods for an operation, e.g., an operation in a cryptographic algorithm against side channel analysis. Accordingly, the operation may receive an input data, and may provide an output data as a function of the value of the input data. In an example embodiment, a protection method may include executing the operation to be protected for all data of an input set including the input data required to be processed by the operation. Each data in the input set may include at least one first word, and the first words in the input set may have a same size and may form a word subset including a same number of occurrences of all of the possible values of the first words in relation to the word size.

In another example embodiment, a protection method may include providing as result of the operation an output set including the expected output data. Each data in the output set may include at least one first word having the same size, and the first words in the output set may form a word subset including a same number of occurrences of all of the possible values of the first words in relation to the size of the word.

Unlike conventional method protections involving hiding the operation to be protected in a flood of identical operations applied to random data and, thus, uncorrelated from the required input data of the operation to be protected, exemplary methods illustrated herein are to execute the operation on other data not chosen randomly. Indeed, such other data are correlated to the required input data insofar as the input set formed of such other data and of the required data to be processed, is such that each data in the input set includes at least one first word, the first words having the same size and forming a word subset including the same number of occurrences of all possible values of the first words having the size of the data susceptible of being processed by the operation. Moreover, the input data to be processed by the operation should have an unpredictable position in the input set, but known by the circuit performing the operation.

The input set may be obtained by combining the required input data X by a logical XOR (Exclusive OR) operation with a mask M1 including for example a value equal to 1 representing a byte having all possible values of one byte (between 0 and 255). Accordingly, if the input data X has the size of one byte, the input set includes 256 data equal to X⊕Ml where Ml=0 to 255, and the required input data X=PX[n]=X⊕Mn, with Mn=0 ("⊕" representing the Exclusive OR (XOR) operator applied to bytes). When the input data is encoded on one byte, an operation can be protected according to an example embodiment by applying the operation to all the data in the input set including the data PX[l+1]=X⊕Ml, with l=0 to 255, i.e., all possible data having the size of one byte. The computations of the output data in the output set may be performed in a random order. To this purpose, the data in the input set can be arranged in a random order.

Figure 2:
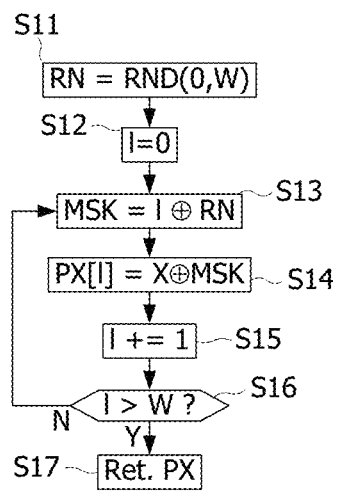
FIG. 2 is a flow-chart of protection steps transforming an input data according to an example embodiment.

FIG. 2 illustrates steps (operations, functions, processes, etc.) S11 to S17 of a procedure for generating an input set PX including an input data X, according to an example embodiment. Steps S11 to S16 may be executed successively. In step S11, a variable RN may receive a random value between 0 and a maximum value W determined according to the size defined by the number of bits used to encode the input data X in binary code. Accordingly, for a variable RN encoded on b bits, the maximum value W equals 2b−1. If the variable RN is encoded on 8 bits, the value W equals 255, and if the variable RN is encoded on 16 bits, the value W equals 65535. In step S12, an index l may be set to 0. In step S13, a variable MSK (=l⊕RN) may be computed by applying XOR operations to the index l and to the variable RN. In step S14, an input data PX[l] designated by the index l in a table forming the input set PX may be computed by applying XOR operations to the input data X, and to the variable MSK.

Figure 3:
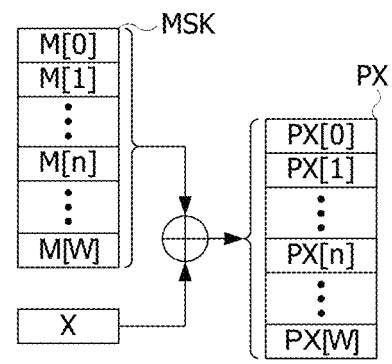
FIG. 3 is a block diagram illustrating protection steps, according to an example embodiment.

FIG. 3 illustrates the input data X, the different values M0 (=0⊕RN), M1 (=1⊕RN), . . . MW (=W⊕RN) of the variable MSK, and/or the different data PX[0], PX[1]), . . . PX[W] of the input set PX.

Referring back to FIG. 2, in step S15, the index l may be incremented by one (1). In step S16, the index l may be compared with the maximum value W, and if it is greater than the value W, step S17 may be executed; otherwise a new iteration of the calculation may be executed in steps S13 to S16. In step S17, the table PX may be provided as an output of the procedure S11-S17, where the expected input data may be in the table PX at an index n (X=PX[n]), and index n having a value such that the variable Mn=0. Indeed, the result of XOR operations applied to data D and 0 does not transform the data D.

It is noted that values of the variable MSK can be processed in a random order and not necessarily in the order from 0⊕RN to W⊕RN. Several operations can be applied to the input set PX to compute an output set. The expected output data can be extracted at a known index n from an output set at a subsequent step in the processing, for example considered less sensitive to side channel analysis.

Further, the input data X can be encoded on several binary words having a same number of bits. Each value given to the variable MSK may also have the same number of bits as each of the words in the data X. If the data is encoded on one byte (8-bit words), the variable MSK can be also encoded on 8 bits. The number of iterations W+1 that must be executed between steps S13 to S16 is equal to 2b, b being the size in number of bits of the data X. If the data X is encoded on one word of 16, 32 or 64 bits, it may be desirable to limit this number of iterations. If the operations applied to the input data are performed byte per byte, the variable MSK may be encoded on 8 bits, and the variable MSK can be combined with the input data X at step S14 by concatenating the variable MSK with itself several times to form a word of the size of the input data X. Therefore, in the event that the data X is encoded on 16 bits, the variable MSK encoded on 8 bits can be concatenated with itself to obtain a word on 16 bits. The operation executed in step S14 then becomes:

$$PX[l]=X \oplus MSK//MSK, \quad (1)$$

"//" representing the concatenation operator of binary words. In the event that the data X is encoded on 32 bits, each value of the variable MSK encoded on 8 bits is concatenated with itself three times to obtain a word on 32 bits. The operation executed in step S14 then becomes:

$$PX[l]=X \oplus MSK//MSK//MSK//MSK. \quad (2)$$

In fact, the variable MSK used as a mask can have the size of the words processed by the considered operation in the algorithm.

Figure 4:
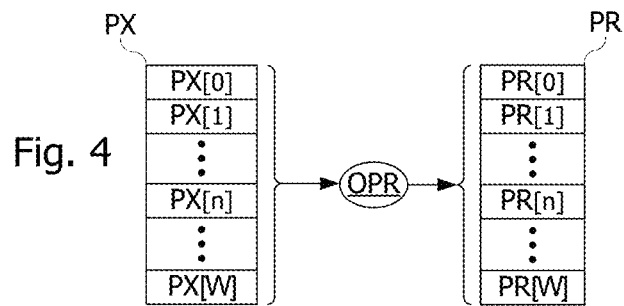
FIG. 4 is a block diagram illustrating an operation performed by the circuit of FIG. 2.

FIG. 4 illustrates application of an operation OPR to a protected data X in the form of an input set PX, which can be obtained using the procedure of FIG. 2, the data X having the size of one or several words. Accordingly, the data X may be represented by an input set PX including data PX[0], PX[2], . . . PX[W], where each of these data having the same size as the input data X. The required input data X may be at index n in the input set PX: X=PX[n], n being an integer number between 0 and W. The result of the operation is an output set PR including W+1 output data PR[0], PR[1], . . . PR[W], wherein each data PR[l] equals OPR(PX[l]). The expected output data OPR(X) is equal to the output data PR[n] located at the same index n in the output set PR. Each data in the output set PR can be expressed as follows:

$$PR[l]=OPR(PX[l])=OPR(X \oplus IM[l])=OPR(X) \oplus OM[l], \quad (3)$$

for each index l between 0 and W, in which IM is an input mask set, OM is an output mask set of several words such that OM[l]=OPR(IM[l]) for each index l between 0 and W, each mask set IM, OM including W+1 mask parameters IM[l], OM[l], Example embodiments provide a protection method that is efficient when each word column of the output set PR includes the same number of occurrences of all possible values of one word, in relation to the size of one word thereof. For this purpose, each of the mask sets IM and OM should include mask parameters, where each includes at least one word arranged in a word column in the mask set and includes one word from each mask parameter of the mask set. The words in one word column of the mask sets IM and OM having the same size and including the same number of occurrences of all possible values of the words in relation to the word size. Example embodiments further provide that if the input mask set has this property, the bit permutation operations, expansive or not, do not generally transmit this property to the output mask set.

In some implementations, this property can be transmitted to the output mask set by choosing particular input mask parameters IM[l]. Such input mask parameters can be determined by the following method.

The output mask set OM is defined such that:

$$OM[l]=OPR(IM[l]), \quad (4)$$

for each index l between 0 and W. Each mask parameter IM[l] is formed of m words IMi[l] of k bits (i=1 to m):

$$IM[l]=IM1[l]//IM2[l]// \ldots //IMm[l]$$

with IMi=ib[i,x1]//ib[i,x2]// ... //ib[i,xk], ib[i,xj] representing a bit number xj of the word IMi, and xj≠xj' for each possible distinct values of j and j', and each index value i between 1 and m, IMi generically representing any value IMi[l]. Each mask parameter OM[l] is formed of m' words OMj of k' bits (i=1 to m'):

$$OM[l]=OM1[l]//OM2[l]// \ldots //OMm'[l]$$

with OMi=ob[i,x1]//ob[i,x2]// ... //ob[i,xk'], ob[i,xj] representing a bit number xj of the word OMi, and xj≠xj' for each possible distinct values of j and j', and each index value i between 1 and m', OMi generically representing any value OMi[l].

Equation (4) can be translated into a set of equations between the bits of the mask parameters words IMi and OMi' using the definition of the bit permutation operation. Solutions in the form of equalities between each of the bits of the words OMi' and one the bits of the words IMi, verifying the above rules between the bits of the words IMi, OMi', can be determined by testing hypotheses.

It is desirable to apply the above-described method to bit permutation operations of DES (Data Encryption Standard) algorithm either implemented by software or in hardware.

Figure 5:
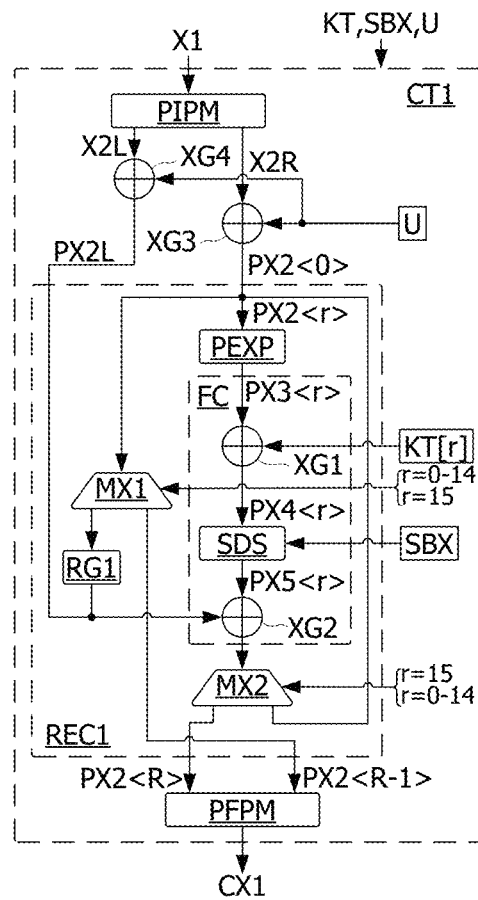
FIG. 5 is a block diagram of DES encryption algorithm including protection steps according to an example embodiment.

FIG. 5 illustrates a cryptographic calculation circuit CT1 implementing the DES algorithm for encrypting a data, in accordance to an example embodiment. For further details about DES algorithm can de described and referred to in document "Data Encryption Standard (DES) FIPS PUB 46-3" published on 25 Oct. 1999. In FIG. 5, the cryptographic calculation circuit CT1 may receive a data X1 to be processed and may supply a resultant data CX1. The circuit CT1 may also receive a round key table KT containing all round keys derived from a secret key according to DES algorithm, and DES substitution tables SBX. The circuit CT1 may include an initial permutation circuit PIPM, a final permutation circuit PFPM, and/or a main encryption circuit REC1 including circuits XG1, XG2 performing XOR operations, an expansion circuit PEXP, a substitute calculation circuit SDS, one register RG1, and/or multiplexers MX1, MX2. The input data X1, which may be encoded on a 64-bit word, may be applied to the initial permutation circuit PIPM. The circuit PIPM may perform the DES initial permutation operation combined with the DES reverse round permutation operation, which can be defined using a single table IPT shown in FIG. 6. The result of the operation performed by the circuit PIPM may be divided into a left and a right 32-bit word. The table IPT may include a left part IPTL and a right part IPTR. Each table part IPTL, IPTR may provide the position in the input data X1 of each of the bits of the output left and right 32-bit words, where the bits in the input data may be numbered from 1 to 64. Each table part IPTL, IPTR may include four lines of eight bits, where each line giving the value of a byte of the output left or right 32-bit word. For example, the first (left) byte of the left output word may include the bit numbers, successively 60, 62, 14, 16, 28, 40, 50 and 54 of the input data X1.

The left word may be transmitted to the circuit XG2. The right word may be transmitted to the circuit PEXP and the multiplexer MX1, which may have one output connected to the register RG1 and one output connected to a right input of the circuit PFPM. The register RG1 may be connected to one input of the circuit XG2. The circuit PEXP may perform a combination of the DES round permutation operation and the DES expansion operation, using a single table PEXT shown in FIG. 7. The circuit PEXP may receive a 32-bit data and may provide a 48-bit data formed of eight 6-bit words to the circuit XG1. Each line of the table PEXT may provide the position in the 32-bit word in input of the circuit PEXP of each bit of a respective one of eight 6-bit words in output of the circuit PEXP. For example, the first left 6-bit word of the output data of the circuit PEXP if formed with the bit numbers, successively, 25, 16, 7, 20, 21 and 29 of the 32-bit word provided to the circuit PEXP (numbered from 1 to 32).

The circuit XG1 may combine the 48-bit word in output of the circuit PEXP with a first round key KT[0] also encoded on 48 bits, by XOR operations. The result of the operation performed by the circuit XG1 may be processed by the substitute calculation circuit SDS which may provide a 32 bit word using the eight DES substitution tables SBX. Each 6-bit word in input of the circuit SDS may be used as an index to select a 4-bit word in a respective one of the eight substitution tables SBX. Thus, the circuit SDS may provide eight 4-bit words, forming a 32-bit data, which may be combined with the 32-bit data in the register RG1, by the circuit XG2 applying XOR operations. The result provided by the circuit XG2 may be transmitted to the multiplexer MX2 having one output connected to the circuit PEXP and the multiplexer MX1, and/or one output connected to a left input of the circuit PFPM. The circuit PFPM may execute the DES round permutation operation and the DES final permutation operation, using a single table FPT shown in FIG. 8. The circuit PFPM may provide a 64-bit word CX1. The table FPT may provide the position in the words in input of the circuit PFPM of each of the bits of the 64-bit output data CX1, where the bits of the left 32-bit word provided to the circuit PFPM may be numbered from 1 to 32, and the bits of the right 32-bit word provided to the circuit PFPM may be numbered from 33 to 64. For example, the first (left) byte of the output data CX1 may include the bit numbers, successively, n° 49, 17, 42, 10, 41, 9, 57 and 25 of the 64-bit data provided to the circuit PFPM.

At a first calculation round based on the DES algorithm, a right 32-bit word (R0) in output of the circuit PIPM may be stored in the register RG1 and processed by the circuit PEXP, and then successively by the circuit XG1, and SDS, and provided to the circuit XG2. The left 32-bit word (L0) in output of the circuit PIPM may be transmitted to the circuit XG2. The right word (R0) may be transferred by the multiplexer MX1 to the register RG1. The word (R1) in output of the circuit XG2 may be transmitted by the multiplexer MX2 to the circuit PEXP for a new calculation round, and to the multiplexer MX1 for a next round. At a second calculation round, the word R1 may be processed by the circuits PEXP, XG1, SDS, and XG2, the circuit XG2 receiving the word (R0) from the register RG1.

At a 16th and last round, a word (R14) in the register RG1 may be combined with an output of the circuit SDS by the circuit XG2, which may provide a word (R16) to the multiplexer MX2 and may transmit the word as a most significant word to the left input of the final permutation circuit PFPM. At the same time, the word R15 (=L16) may be provided by the multiplexer MX1 as a least significant word to the right input of the circuit PFPM which outputs the output data CX1.

Figure 9:
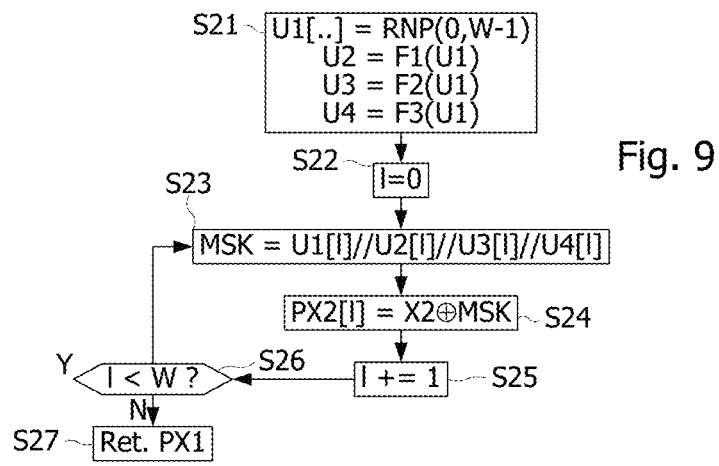
FIG. 9 is a flow-chart of protection steps transforming an input data according to another example embodiment.

In some implementations, the circuit CT1 may receive a mask set U, and may include circuits XG3, XG4 performing XOR operations with mask parameters U[l] from the mask set U. The circuits XG3, XG4 may process the data X2L, X2R received from the circuit PIPM to provide two data sets PX2L, PX2R (=PX2<0>) by executing steps S21 to S27 of FIG. 9. The steps S22 and S24 to S27 may be the same as the steps S12 and steps S14 to S17. At step S21, a random permutation U1 may be generated, the permutation U1 including all the 256 byte values (between 0 and 255) in a random order. Permutations U2, U3 and U4 may further be generated by respectively applying functions F1, F2, F3 to the permutation U1. At step S23, the mask value MSK can be generated by concatenating the bit strings U1[l], U2[l], U3[l] and U4[l], where Ui[l] is a byte of rank l in the permutation Ui, and i=1, 2, 3 and 4. Thus, at step S24, each of the 32-bit right and left words X2R, X2L is combined with a 32-bit word formed as follows:

$$PX2[l]=X2 \oplus U1[l]//U2[l]//U3[l]//U4[l]. \qquad (5)$$

with X2=X2R (or X2L) and PX2=PX2R (resp. PX2L).

Figure 10:
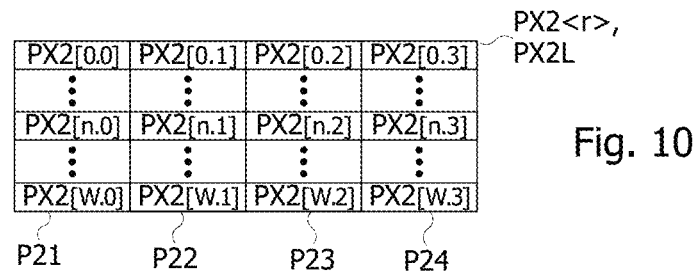
FIG. 10 is a block diagram of an intermediary data set obtained when executing the DES algorithm, according to an example embodiment.

As shown in FIG. 10, each output set PX2R (=PX2<0>), PX2L includes W+1 (=256) 32-bit words PX2[l], or four columns P21, P22, P23, P24 of W+1 bytes, where each column including a single occurrence of each possible value of one byte, and in particular, one occurrence of the output datum X2R, X2L at a row n, n being such that U1[n]=0. Since the mask word sets U2, U3 and U4 are derived from mask word set U1 by applying functions (F1, F2, F3), U2[n]=U3[n]=U4[n]=0.

Figure 11:
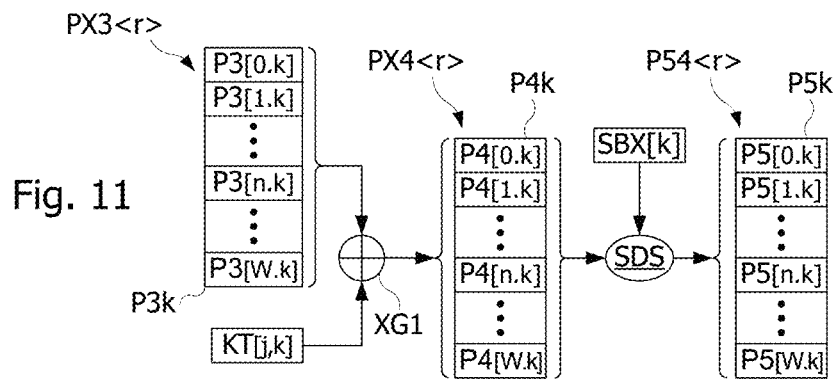
FIG. 11 is a block diagram illustrating operations of DES algorithm, according to an example embodiment.

As shown in FIG. 11, the circuit PEXP may provide an output set PX3<0> including eight (8) columns P3k (k=0 to 7) of W+1 6-bit words P3[l.k] (l=0 to W). In accordance with the mask table U as described-above, each column P3k of the output set PX3<0> may include four (4) occurrences of each possible value encoded on six bits ($4 \times 2^6=256$). Accordingly, the use of the mask table U allows the protection of an expansive bit permutation operation such as the one performed by the circuit PEXP.

Figure 12:
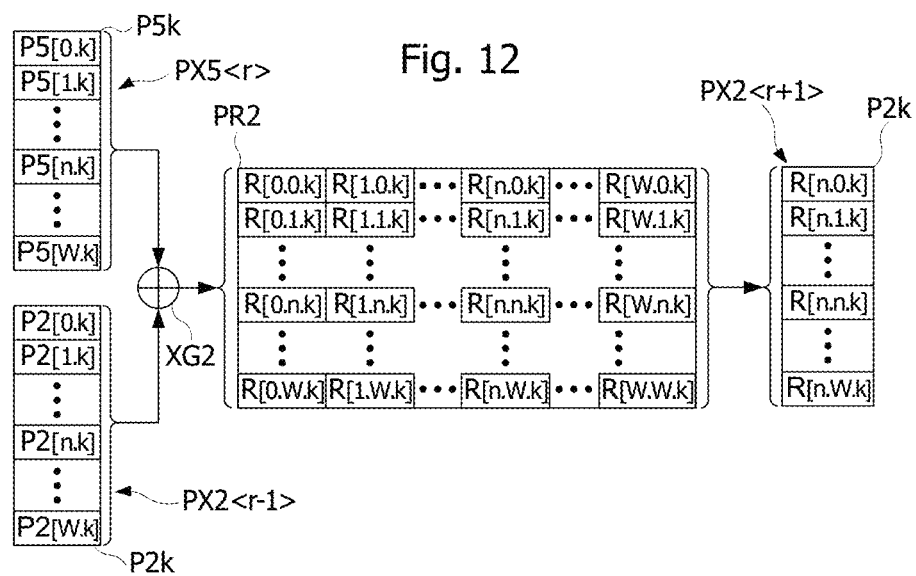
FIG. 12 is a block diagram illustrating an operation of DES algorithm, according to an example embodiment.

In some implementations, a circuit FC including the circuits XG1, SDS and XG2 successively may process each column P3k, one after the other, as illustrated in FIGS. 11 and 12. In FIG. 11, the circuit XG1 may combine each 6-bit word P3[l.k] (l=0 to W=255) of the column P3k with a respective part KT[r,k], of 6 bits of the 48-bit round key KT[r], and may provide a column P4k of the output set PX4<0> of W+1 6-bit words P4[l.k], including four (4) occurrences of each possible value encoded on six (6) bits ($4 \times 2^6=256$). The substitution operation performed by the circuit SDS may be executed with all the 6-bit words P4[l.k] in the column PX4k of the set PX4<0> using a respective DES substitution table SBX[k]. Each 6-bit word P4[l.k] in the column P4k may be used as an index to select a 4-bit word P5[l.k] in the DES substitution table SBX[k]. The circuit SBS may provide a column P5k of the output set PX5<0> including W+1 4-bit words P5[k.l] (l=0 to W), and sixteen (16) occurrences ($16 \times 2^4=256$) of each possible value encoded on four bits.

The circuit XG2 may perform XOR operations between each 32-bit word P5[l.k] in the column P5k of the output set PX5<r> (computed at round r) and each 32-bit word P2[l2.k] in the column P2k of the output set PX2<r−1>, (l1=0 to W and l2=0 to W). As illustrated in FIG. 12, the result of the XOR operations forms a table PR2 including (W+1)(W+1) 4-bit words R[0.0.k] to R[W.W.k], where each 4-bit word R[l1.l2.k] is computed as follows:

$$R[l1.l2.k]=P5[l1.k] \oplus P2[l2.k], \qquad (6)$$

with P2[l2.k] representing the 4-bit words of the column P2k of the set PX2L at round r=0, and of the set PX2<r−1> at other rounds r=1 to 15.

In accordance to the permutations U1, U2, U3, U4, each column R[l.k] (l=0 to W) of the output table PR2 may include W+1 4-bit words and 16 occurrences of all possible values of one 4-bit word. In addition, the expected output 4-bit word may remain at the same rank (row and column numbers) n of the input data X1 in the input set PX1, n being such that Ui[n]=0, with i=1, 2, 3 and 4.

In some implementations, the column R[n.k] including all data R[n,l2,k] may be extracted from the table PR2 to be stored as the column P2k of the output set PX2<r+1> provided by the circuit XG2. Accordingly, the extracted column R[n.k] may include all data P5[n.k] $\oplus$ P2[l2.k]. Therefore, the masks parameters coming from the output set PX5<r> and transformed by the substitution operation may be removed, and only the masks parameters U coming from the output set PX2<r−1> may remain.

Then a next column P2k of the set PX2<r+1> may be computed by the circuits XG1, SDS and XG2, until all columns P2k (k=1 to 8) are processed, such that the output set PX2<r+1> is completely defined. Since only the mask parameters U coming from the output set PX2<r−1> may remain in the resultant set PX2<r+1>, the latter may include W+1 32-bit words or four (4) columns of W+1 bytes, where each byte column including one occurrence of each possible byte value.

In some implementations, processing of the columns P2k may be independent from each other and can be performed in any order, provided that the order of the operations applied to each column is respected.

At the last round R, the circuit PFPM may receive two output sets PX2<R> and PX2<R−1>. The circuit PFPM may provide the 64-bit output data CX1 by selecting the output data PX2<R>[n] and PX2<R−1>[n] at the index n in the output sets PX2<R> and PX2<R−1> and by applying the DES round permutation and the DES final permutation to the selected data. It is noted that the mask parameters U[i] may be kept throughout the operations performed by the circuits PEXP and FC, thanks to the choice of the extracted column in the output set PR2. In addition, a fault injection can be detected by combining each data PX2<R>[l] and PX2<R−1>[l] of the output sets PX2<R> and PX2<R−1> with the respective mask parameters U[l] and by detecting a resultant data different from the others.

The permutations U1, U2, U3, U4 can be generated such that the 48-bit word provided by the circuit PEXP applied to each of the words U[l]=U1[l]//U2[l]//U3[l]//U4[l] (l=0 to W) includes eight six-bit words, each including only once bits of the words U1[l], U2[l], U3[l], U4[l]. When this condition is met, each 6-bit word column of the set provided by the circuit PEXP applied to each of the words U1[l]//U2[l]//U3[l]//U4[l] includes four (4) occurrences of each possible value encoded on six bits. For example, if U1[l]=U2[l]=U3[l]=U4[l]=b0//b1//b2//b3//b4//b5//b6//b7, the circuit PEXP receiving the 32-bit word U1[l]//U2[l]//U3[l]//U4[l] provides the following 6-bit words:

b0//b7//b6//b3//b4//b4 which contains twice the bit b4, b4//b4//b3//b3//b0//b0 which contains twice the bits b0, b3 and b4, b0//b0//b6//b1//b4 which contains twice the bits b0 and b6, b1//b4//b1//b6//b1//b1 which contains four times the bit b1, b1//b1//b7//b5//b7 which contains twice the bit b1 and three times the bit b7, b5//b7//b2//b2//b0//b2 which contains three times the bit b2, b0//b2//b4//b5//b5 which contains three times the bit b5, b5//b5//b2//b3//b0//b7 which contains twice the bit b5.

Therefore, the condition that each output mask word OMi' includes only bits of different numbers is not fulfilled.

The above-condition on the result provided by the circuit PEXP can be expressed by an equation system, in which the resolution of which provides a great number of solutions (about $2^{22}$ solutions). The solutions can be expressed in the form of values of three first permutations, for example U2, U3, U4, as a function of a last permutation, U1. Some of these solutions are in the following:

U2=b0//b2//b1//b3//b4//b5//b6//b7
U3=b1//b0//b3//b2//b5//b6//b7//b4
U4=b0//b3//b1//b2//b4//b7//b5//b6
U2=b1//b3//b0//b6//b4//b5//b2//b7
U3=b5//b7//b3//b0//b4//b6//b1//b2
U4=b2//b6//b0//b3//b1//b7//b5//b4
U2=b0//b2//b1//b4//b3//b6//b5//b7
U3=b3//b0//b7//b1//b2//b4//b6//b5
U4=b0//b7//b4//b1//b5//b2//b6//b3 with U1=b0//b1//b2//b3//b4//b5//b6//b7. Each of these solutions defines the permutation functions F1, F2, F3 used in step S21. If the circuit PEXP receives the 32-bit word U1[i]//U2[i]//U3[i]//U4[i] as defined in the first solution, it provides the following 6-bit words:

b0//b7//b6//b2//b5//b4,
b5//b4//b3//b2//b1//b0,
b1//b0//b6//b7//b3//b4,
b3//b4//b0//b5//b2//b1,
b2//b1//b7//b4//b5//b6,
b5//b6//b1//b2//b0//b3,
b0//b3//b4//b7//b5//b6,
b5//b6//b1//b3//b0//b7.

It is noted that none of the 6-bit words above contains twice (or more) the same bit of the permutation U1.

It is further noted that the protection method previously disclosed may be applied only to some operations performed in DES algorithm which would be detected as vulnerable to side channel analysis. For example, the protection method can be applied only to the first and last rounds of DES algorithm, from which sensitive data could leak.

The decryption according to DES algorithm includes substantially the same operations as the encryption algorithm. Therefore, exemplary protection methods described herein can be applied to protect a program and a circuit implementing DES decryption algorithm.

More generally, exemplary protection methods described herein can be applied to any other encryption or decryption algorithm including a bit permutation operation, such as algorithms based on a Feistel scheme, for example, but not limited to, Blowfish, Camellia, CAST-128, FEAL, ICE, RC5, Triple DES and/or Twofish.

Figure 13:
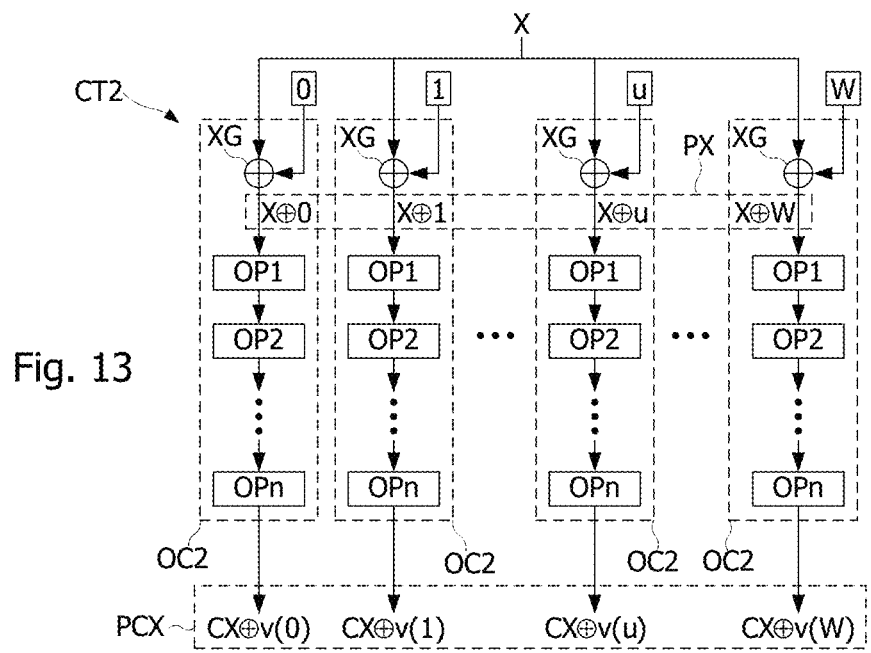
FIG. 13 is a block diagram of a circuit protected according to an example embodiment.

FIG. 13 illustrates a circuit CT2 receiving an input data X to be processed and serially performing several operations OP1, OP2, . . . OPn applied to the input data X, in accordance with an example embodiment. The circuit CT2 may include several circuits OC2, where each serially performing the operations OP1, OP2, OPn. Each circuit OC2 may receive the input data X and a respective input mask parameter u of an input mask parameter set. Accordingly, the circuit CT2 may include W+1 circuits OC2, respectively, receiving masks equal to 0, 1 . . . W, W representing the greatest possible value of the mask parameter u when considering the size in bits of the mask parameter. Each circuit OC2 may include a circuit XG applying XOR operations to the input data X and to the mask parameter u (=0 or 1, . . . or W). In each circuit OC2, the data $X \oplus u$ (u=0, . . . W) provided by the circuit XG of the circuit OC2 may be applied to an input of the operation OP1 of the circuit OC2. The operations OP1-OPn are such that:

$$OPn( \ldots OP2(OP1(X \oplus u)) \ldots )=CX \oplus v(u), \quad (7)$$

where "$\oplus$" represents the XOR operator, v(u) represents an output mask parameter depending on the input mask parameter u and CX is the result of the operations OP1-OPn applied to the input data X:

$$CX=OPn( \ldots OP2(OP1(X)) \ldots .$$

Accordingly, each circuit OC2 may provide an output data equal to $CX \oplus v(u)$ (u=0, 1, . . . , or W). Therefore, the circuit CT2 may provide an output set PCX including the output data $CX \oplus v(0), CX \oplus v(1), \ldots CX \oplus v(u), \ldots CX \oplus v(W)$. The operations OP1-OPn can be adapted such that the output data corresponding to the input data $X \oplus u$ provided by the operations OP1-OPn may be equal to $CX \oplus v(u)$ for each value of the mask parameter u (0-W) and the set of output mask parameters v(u) with u=0 to W, is such that each output mask parameter may include at least one first word. The first words of all the mask parameters in the output mask set may have the same size and may form a subset including the same number of occurrences of all possible values of the words when considering the size of the output masks parameters v(u) words. Each output mask parameter v(u) can be equal to the corresponding input mask parameter u.

In some implementations, the computations of the output data in the output set PCX may be performed in a random order, and/or stored in a random order. Accordingly, the different values of the mask parameter u may be respectively applied to the circuits OC2 in a random order. Thus, the circuit OC2 of rank k in the circuit CT2 may receive an input mask parameter u=U[k], U being a mask set generated by random permutation of all possible numbers between 0 and W. Similarly, the circuit OC2 of rank 0 in the circuit CT2 may receive a mask parameter U[0], and the circuit OC2 of rank W in the circuit CT2 may receive an input mask parameter U[W].

In some implementations, the circuits OC2 may be independent from each other and the computation of each of the data $CX \oplus v(u)$ of the output set PCX may be independent from the computations of the other data of the output set. Therefore the operations OP1-OPn in all the circuits OC2 can be performed in any order, provided that the order of the operations within each circuit OC2 is respected.

Figure 14:
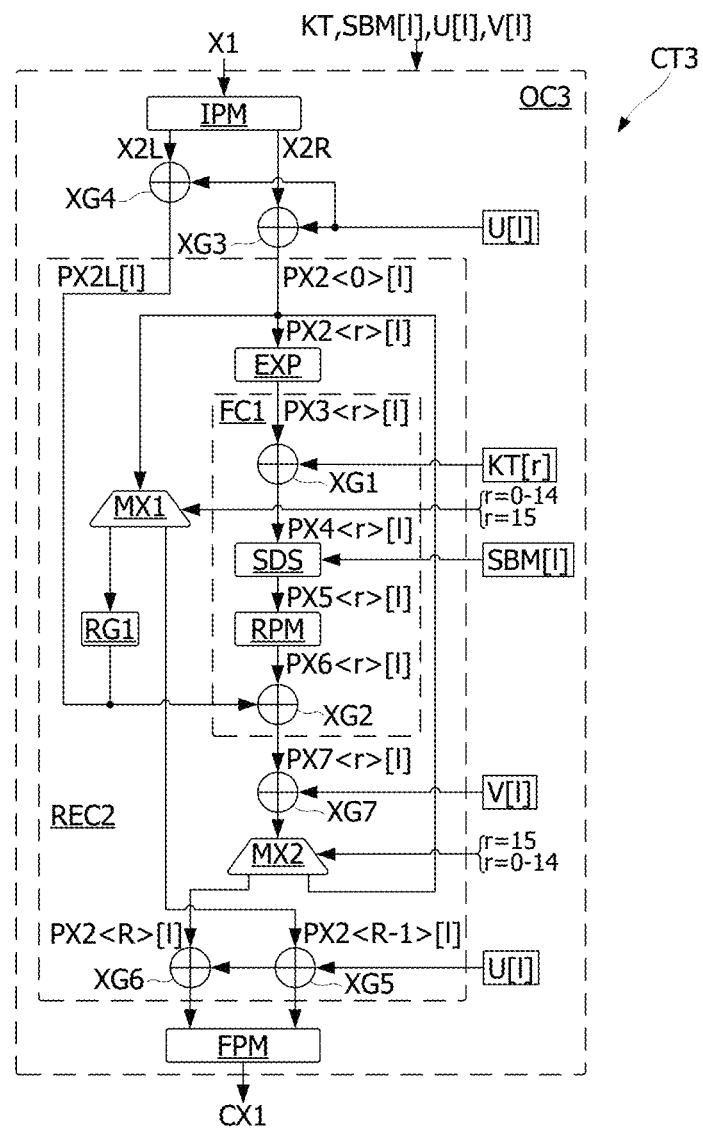
FIG. 14 is a block diagram of DES encryption algorithm, including protection steps according to another example embodiment.

FIG. 14 illustrates a cryptographic calculation circuit CT3 implementing the DES algorithm for encrypting a data, in accordance with another example embodiment. The circuit CT3 differs from the circuit CT1 in that it has the architecture of the circuit CT2, and thus includes W+1 circuits OC3, where each receiving the input data X1 and a respective mask parameter U[l] from the mask set U. Each circuit OC3 may differ from the circuit CT1 in that it processes one respective data from the data sets generated by the circuits XG3, XG4. In addition, the circuit RIPM may be replaced by an initial permutation circuit IPM only performing the DES initial permutation operation. The main encryption circuit REC1 may be replaced by another circuit REC2 including an expansion circuit EXP only performing the DES expansion operation. The circuits XG1, XG2 and SDS, the multiplexers MX1, MX2, the register RG1, and/or a permutation circuit RPM performing the DES round permutation operation inserted between the substitution circuit SDS and the circuit XG2. The circuit RFPM may be replaced by a circuit FPM only performing the DES final permutation. FIG. 14 illustrates only a part of the circuits XG1, XG2, SDS, MX1, MX2, RG1 and RPM belonging to one of the circuits OC3.

The circuit SDS may use masked substitution tables SBM. In addition, each circuit OC3 may include circuits XG5, XG6, XG7 performing XOR operations with the mask parameters U[l], U[l], and mask parameter V[l] from a mask table V, respectively. The circuits XG5, XG6 may be interposed between the multiplexers MX1, MX2, respectively, and the circuit FPM. The circuit XG7 may be interposed between the circuit XG2 and the multiplexer MX2. The circuits XG3 and XG4 of all the circuits OC3 may provide 32-bit word input sets PX2<0> and PX2L from the output data X2L, X2R provided by the circuit IPM. The circuits EXP of all circuits OC3 may provide a 48-bit word output set PX3<r> from the output set PX2<r>, r being the DES round number, from 0 to R. The circuits XG1 of all circuits OC3 may provide the 48-bit word output set PX4<r> from the output set PX3<r>. The circuits SDS of all circuits OC3 may provide the 32-bit word output set PX5<r> from the output set PX4<r>. The circuits RPM of all circuits OC3 may provide the 32-bit word output set PX6<r> from the output set PX5<r>. The circuits XG2 of all circuits OC3 may provide the 32-bit word output set PX7<r> from the output set PX6<r> and the set PX2L (at the first round) or the output set PX2<r−1> stored in the register RG1 (at the other rounds). Finally, the circuits XG7 of all circuits OC3 may provide the 32-bit word output set PX2<r+1> from the output set PX7<r>. The circuits XG5 of all circuits OC3 may remove the mask U[l] from the data PX2[l]<R−1>, and the circuits XG6 may remove the mask parameter U[l] from the data PX2[l]<R>.

In some implementations, the mask table U in input of the circuit CT3 may include W+1 32-bit words, where each may be obtained by concatenating four bytes U1[l], U2[l], U3[l], U4[l] (U[l]=U1[l]//U2[l]//U3[l]//U4[l], for each integer number l between 0 and W=255), U1, U2, U3, U4 being four permutations of W+1 bytes, such that:

$$U2=F1(U1),$$

$$U3=F2(U1), \text{ and}$$

$$U4=F3(U1), \quad (8)$$

F1, F2, F3 being 8-bit functions, such that each of the 48-bit words EXP(U[l]) provided by the circuit EXP applied to each of the 32-bit words U[l] (l=0 to W), includes eight six-bits words, each including only once bits of the 8-bit word U1[l]. In other words, the transformed set EXP(U) obtained by applying the expansion function EXP to the mask set U has the form of a table of (W+1)(W3+1) 6-bit words, where each column of (W+1) 6-bit words may include four (4) occurrences of each possible value (0 to 63) of a 6-bit word.

As illustrated in FIG. 12, the circuit XG1 may combine each 6-bit word P3[k.l] (l=0 to X=255) of the column P3k with a respective part KT[r][k], of 6 bits of the 48-bit round key KT[r], and may provide a column P4k of the output set PX4<0> of W+1 6-bit words P4k.l, including four (4) occurrences of each possible value encoded on six (6) bits (4×26=256).

Figure 15:
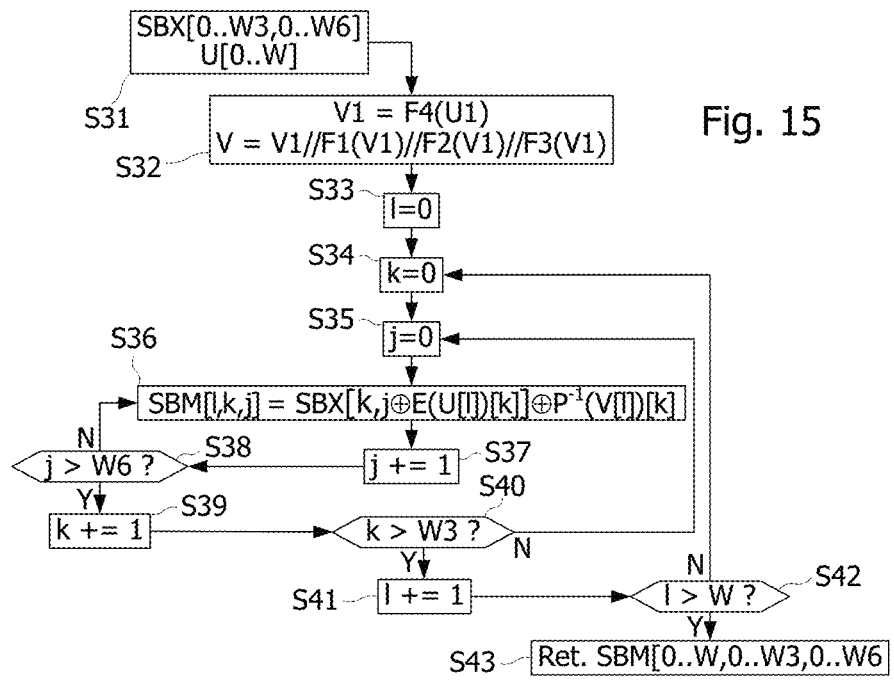
FIG. 15 is a flowchart of a method for generating a protected substitution table, according to an example embodiment.

FIG. 15 illustrates steps (operations, functions, processes, etc.) S31 to S43 of executing a procedure of masked substitution tables SBM, according to an example embodiment. Steps S31 to S38 may first be successively carried out. At step S31, the procedure receives the DES substitution tables SBX and the mask set U. The substitution tables SBX, may include W3+1 (=8) substitution tables SBX[0 . . . W3, 0 . . . W6], including W6+1 (=64) 4-bit words. At step S32, a mask set V may be computed. The mask set V may include W+1 32-bit mask parameters, where each may be formed of four bytes V1[l], V2[l], V3[l], V4[l], (l=0 to W), V1, V2, V3, V4 and permutations of W+1 bytes (including a single occurrence of each possible value of one byte).

In some implementations, the permutation V1 may be generated by applying a function F4 to the permutation U1. The function F4 may be selected such that the permutation Z1 formed of the bytes U1[l]⊕F4(U1[l]) with l=0 to W, also forms a permutation of W+1 bytes including a single occurrence of each possible value of one byte. The function F4 may further be selected such that the set $P^{-1}$(V[l]) resulting from the application of an inverse $P^{-1}$ of the DES round permutation operation performed by the circuit RNP applied to the mask parameters V[l] of the set V, may include a single occurrence of each possible value of one byte. The permutation V1 can be defined from the permutation U1, using the equations (10) or (11), considering that V0=F4(U0). The permutations V2, V3 and V4 may be computed using the permutations functions F1, F2, F3 used to compute the permutations U2, U3, U4. Thus:

$$V2=F1(V1),$$

$$V3=F2(V1), \text{ and}$$

$$V4=F3(V1). \quad (9)$$

The permutation U1 and the permutation functions F1, F2, F3 may further be selected such that each of the 32-bit words RNP(V[l]) provided by the inverse $P^{-1}$ of the operation performed by the circuit RNP applied to each of the 32-bit words V[l] (l=0 to W), includes eight 4-bits words, each including only once bits of the 8-bit word V1[l]. In other words, the transformed set $P^{-1}$(V) has the form of a table of (W+1)(W3+1) 4-bit words, each column of (W+1) 4-bit words including sixteen (16) occurrences of each possible value (0 to 15) of a 4-bit word.

In some implementations, one or several pairs (U0, V0) of mask tables U1 and V1 (such as V0=F4(U0)) may be stored in the circuit CT3. Each pair (U0, V0) may be tested as providing a table Z including values Z[l]=U0[l]⊕V0[l] for l=0 to W, and may include a single occurrence of all possible values of a word having the size of the masks parameters U1[l] or V1[l] (one byte in the present example). The circuit CT3 may be configured to use as mask tables U1, V1, derived pairs of mask tables (u2, v2) computed as follows:

$$u2[l]=PM(u1[l]⊕UR)$$

$$v2[l]=PM(v1[l]⊕VR), \quad (10)$$

or $$u2[l]=PM(u1[l])⊕UR$$

$$v2[l]=PM(v1[l])⊕VR,$$

for each index l between 0 and W, where UR and VR are random words of the size of any of the masks parameters U0 or V0, u1 and v1 are previously computed tables obtained by the equations (10) or (11), or equal to U0 and V0 respectively, and PM is a randomly selected permutation applied to the elements of the tables u1 and v1. It is noted that each pair (u2, v2) computed using the equations (10) or (11) has the property of providing a table Z (Z[l]=u2[l]⊕v2[l]) including the same number of occurrences of all possible values of a word having the size of the masks parameters U1[l] or V1[l]. Then, the permutation u2 may be chosen for the permutation U1, and the permutation v2 is chosen for the permutation V1.

At step S33, an index l may be initialized to zero (0). At step S34, an index k may be initialized to zero (0). At step S35, an index j may be initialized to zero (0). At step S36, one element of the masked table SBM is computed using the following equation:

$$SBM[l,k,j]=SBX[k,j]\oplus E(U[l][k])\oplus P^{-1}(V[l])[k] \quad (12)$$

where SBX[k] represents the DES substitution table of rank k (with k=0 to W3=7), each table SBX[k] including 64 4-bit words which can be selected using 6-bit indexes, E(U[l]) represent a 48-bit word resulting from the DES expansion operation performed by the circuit EXP, applied to the mask parameter U[l], E(U[l])[k] represents a 6-bit word of rank k in the 48-bit word E(U[l]), $P^{-1}$(V[l]) represents a 32-bit word resulting from an inverse of the DES round permutation operation performed by the circuit RNP applied to the mask parameter V[l], and $P^{-1}$(V[l])[k] represents a 4-bit word of rank k in the 32-bit word $P^{-1}$(V[l]). At step S37, the index j is incremented by one (1) equation. At step S38, the index j may be compared with a maximum value W6 which is equal to $2^6-1$ (=63). If the index j is greater than the value W6, steps S39 and S40 may be executed; otherwise steps S35 to S38 may be executed again for a new iteration. At step S39, the index k may be incremented by one (1). At step S40, the index k may be compared with a maximum value W3 which is equal to $2^3-1$ (=7). If the index k is greater than the value W3, steps S41 and S42 may be executed; otherwise steps S35 to S40 may again be executed for a new iteration. At step S41, the index l may be compared with the maximum value W which is equal to $2^8-1$ (=255). If the index l is greater than the value W, step S43 may be executed; otherwise steps S34 to S42 may again be executed for a new iteration. At step S43, the masked substitution tables SBM[0 . . . W,0 . . . W3] may be provided as a result of steps S31 to S42.

Accordingly, the substitution operation realized by the circuit SDS may be performed using a different masked substitution table SBM[l,k] for each word P4[l,k], for all values of l between 0 and W, and for all values of k between 0 and W3. In accordance to exemplary mask tables U and V as described herein, the output set PX5<r> in output of the circuit SDS may include W3+1 (=8) columns P5k of 16 occurrences of each of the 16 possible 4-bit word values. The permutation operation performed by the circuit RPM may provide an output set PX6 including 4(W+1) 8-bit words. In accordance to exemplary masked substitution tables SBM as described herein, and the mask table V, each byte column of the output set PX6 may also include one occurrence of each of the 256 possible byte values. It is noted that the above-definition of the mask tables U et V allows the protection of a bit permutation operation either expansive, such as the operation performed by the circuit EXP, or not expansive as the operation performed by the circuit RPM.

Figure 16:
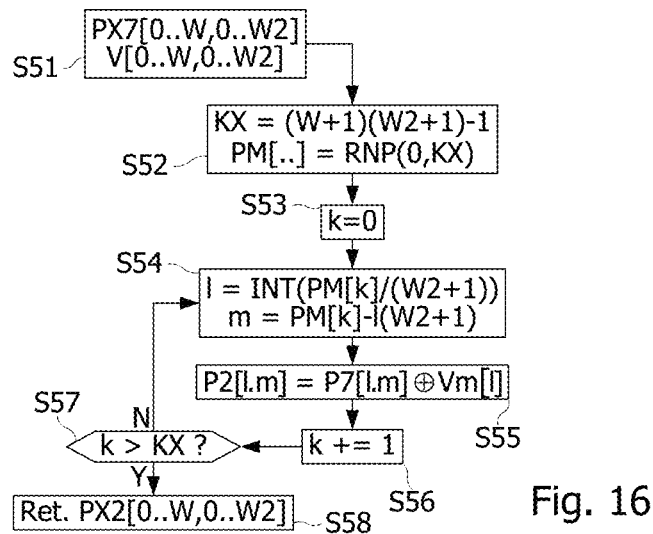
FIG. 16 is a flowchart of an XOR operation protected according to an example embodiment.

Accordingly, the circuit XG2 may combine the output set PX6<r> with the output set PX2<r–1>, by applying XOR operations to each data PX6<r>[l] and to the corresponding data PX2<r–1>[l] at the same index l. The circuit XG2 can apply XOR operations byte per byte to the data PX6<r>[l] and PX2<r–1>[l]. Based on the function F4 to define the mask parameter bytes V1[l] from the mask parameter bytes U1[l], and the use of the functions F1, F2, F3 to define the other bytes U2[l], U3[l], U4[l], V2[l], V3[l], V4[l], each 32-bit word of the output set PX7<r> provided by the circuit XG2 is masked by the mask parameter combination U[l]⊕V[l], the mask parameters U[l] coming from the words of the output set PX2<r–1> and the mask parameters V[l] coming from the words of the output set PX6<r>. In addition, each byte column of the output set PX7<r> may include a single occurrence of all possible byte values. The circuit XG7 may remove the masks V[l] from the output set PX7<r> to provide the output set PX2<r+1> by performing XOR operations applied to 4-bit words. An example of the procedure performed by the circuit XG7 is illustrated in FIG. 16. In this example, all XOR operations may be performed in a random order. The procedure of FIG. 16 includes steps S51 to S58. Steps S51 to S57 may be successively executed. At step S51, the mask table V and the output set PX7 are input. The output set PX7 may include bytes P7[0,0], . . . P7[W,W2] (W2=22–1=3) and the mask table V, which may include W 32-bit masks parameters V[0], . . . V[W], may be considered as a table of (W+1)(W2+1) bytes. At step S52, a permutation PM in the form of a table may be randomly generated using the function RNP, the permutation PM including (W+1)(W2+1) values between 0 and a maximum value KX=(W+1)(W2+1)–1, where W+1 is the number (=256) of 32-bit words in the tables PX7, and/or V (W is also the greatest value in these tables). At step S53, an index k may be initialized to zero (0). At step S54, indexes l and m may be computed from the index k by considering that the permutation PM may be a two-entry table including rows of W2+1 elements and columns of W+1 elements. Accordingly, the index l can be computed as being the integer part INT(PM[k]/W2+1) of the division of the value PM[k] by (W2+1), and the index m can be computed as being the difference between the value PM[k] and the product of the index l by (W2+1). Step S55 may compute the output word P2[l.m] at indexes l and m in the output set PX2 by combining by XOR operations the input word P7[l.m] at indexes l and m randomly selected in the input set PX7 with the mask parameter Vm[l] at index l randomly selected in the mask table V, using the random permutation PM (P2[l.m]=P7[l.m]⊕Vm[l]), Vm[l] representing the byte m in the 32-bit mask parameter V[l]. At step S56, the index k may be incremented by one (1). At step S57, the index k may be compared with the maximum value KX. If the index k is greater than the value KX, step S58 may be executed; otherwise steps S54 to S57 may again be executed for a new iteration. At step S58, the output set PX2 may be completely defined and provided as output of steps S51 to S57.

It is noted that such a permutation PM can be also used by the other circuits of the circuits OC3, such as XG1, XG2, RPM to process and/or store the different words in the processed data sets in a random order. The generation and use of the permutation PM can be omitted if the data in the table PX2 may be computed and/or stored in a deterministic order. In addition, the large and costly permutation PM can be replaced by two permutations of W+1 elements and W2+1 (=4) elements, respectively, the elements of which are read within two nested loops, one for selecting an element of a first one of the two permutations and, one for selection an element of the other one of the two permutations.

In some implementations, the computation of the substitution masked tables can also be performed in a random order by using one or several random permutations.

Figure 17:
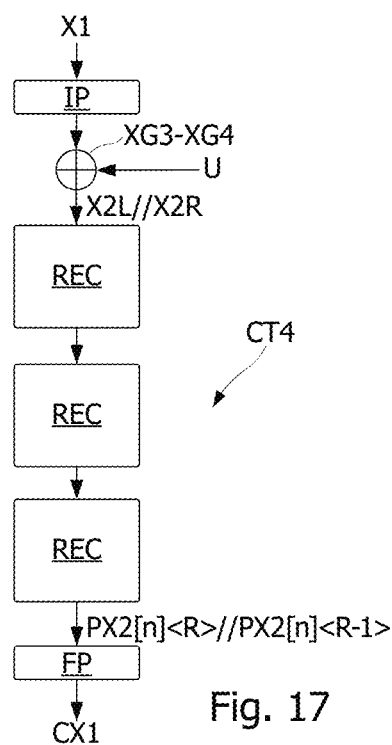
FIG. 17 is a block diagram illustrating a circuit implementing the DES encryption algorithm, according to an example embodiment.

FIG. 17 illustrates a circuit CT4 implementing the Triple DES algorithm, protected according to an example embodiment. The circuit CT4 may include, in series, a circuit IP performing the DES initial permutation, several main encryption circuits REC, a circuit FP performing the DES final permutation, and the circuits XG3 and XG4 inserted between the circuit IP and a first of the circuits REC. The circuits IP, REC and FP can be for example the circuits PIPM, REC1 and PFPM of FIG. 5, or the circuits IPM, REC2, FPM of FIG. 14. The circuit FP may receive the input data X1. The circuits XG3, XG4 may introduce the mask set U in the processing by generating the input data sets X2L, X2R. The last circuit REC may provide a final output data PX2[$l$]<R>//PX2[$l$]<R−1> to the circuit FP, which may provide the output encrypted data CX1. Between two circuits REC, one of the two circuits REC may provide an intermediary output set PX2<R>//PX2<R−1> of 64-bit data PX2[$l$]<R>//PX2[$l$]<R−1>, which may be processed first by the expansion circuit PEXP or EXP of the next circuit REC, without having to remove the masks of the intermediary output set or extract the output data. Hence, the whole process is protected from the circuits XG3, XG4 to the circuit FP.

Figure 18:
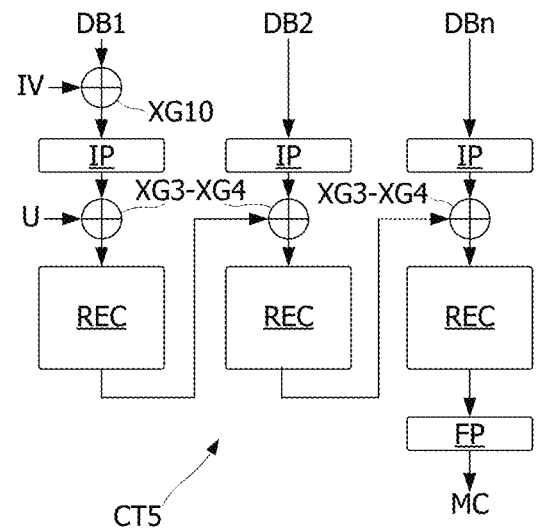
FIG. 18 is a block diagram illustrating a circuit implementing the DES encryption algorithm, according to another example embodiment.

FIG. 18 illustrates a circuit CT5 implementing a block cipher-based message authentication code algorithm such as CMAC (Cipher-based Message Authentication Code) based on the DES algorithm, in accordance with another example embodiment. The circuit CT5 may include several stages, where each stages may include a circuit IP implementing the DES initial permutation, circuits XG3, XG4, and/or a main encryption circuit REC implementing the DES or Triple DES algorithm. The circuits IP, REC and FP can be for example the circuits PIPM, REC1 and PFPM of FIG. 5, or the circuits IPM, REC2, FPM of FIG. 14.

A first stage may include a circuit XG10 performing XOR operations combining a 64-bit initial value IV with a first input data bloc DB1 of 64 bits. A final stage may include the circuit FP receiving the data provided by the circuit REC of the final stage, and may provide an output data MC. Both the circuits XG3, XG4 of the first stage may receive the mask set U. The output data provided by the circuit REC of the first stage may be provided to an input of the circuits XG3, XG4 of a next stage, where the circuit XG3 may receive the right part of the output data and the circuit XG4 may receive the left part of the output data. The circuit IP of the next stage may receive another data block DB2, . . . DBn. The final stage may include circuit FP receiving a 64-bit output data from the circuit REC of the final stage, and providing an output data MC.

Figure 19:
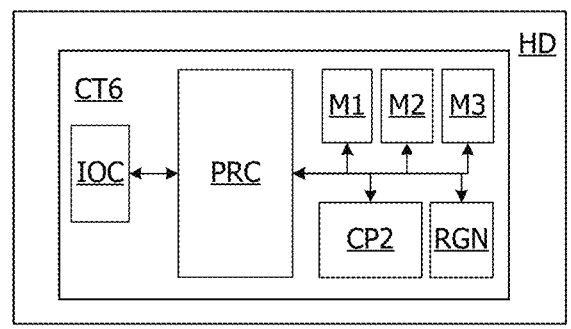
FIG. 19 is a block diagram illustrating a secure circuit, according to another example embodiment.

FIG. 19 illustrates an integrated circuit CT6 arranged on a portable medium HD such as, for example, a plastic card, and implementing one of the protection methods previously described, according to another example embodiment. The integrated circuit CT6 may include the same units as the integrated circuit CT described above in connection with FIG. 1, and differs from the latter in that the co-processor CP1 is replaced with a co-processor CP2 implementing one and/or the other protection methods described above, for example in the form of the circuit CT1, CT2, CT3, CT4 or CT5. In some implementations, the co-processor CP2 may be configured to provide output tables of resulting data, rather than a single data of a cryptographic operation, where each output table including the expected result of the cryptographic operation. The output table being such that all data in the output table may include at least one first word, and the first words in the output table may have the same size and may include the same number of occurrences of all possible values of the first words. The processor PRC can be configured to have access to the mask table V. Thus, the processor PRC can deduce the output data from the output set by combining any one of the data in the output set by one mask parameter in the mask table V or U. The selected data may have a same rank in the output set as the mask parameter selected in the mask table V or U.

The co-processor CP2 may also be configured to execute a part of the cryptographic operation. In this case, the processor PRC may be configured to produce output sets of resulting data including the result of the cryptographic operation, where each output set being such that all data in it have at least one first word. The first words of all data of the output set may have the same size and may form a subset including a same number of occurrences of all possible values of the first words.

The methods disclosed herein may also be implemented by software programs executable by a computer system. Further, implementations may include distributed processing and parallel processing, especially for processing in parallel several or all data in the input data sets and/or for providing in parallel several or all data in the output data sets.

The illustrations described herein are intended to provide a general understanding of the structure of various embodiments. These illustrations are not intended to serve as a complete description of all of the elements and features of apparatus, processors and systems that utilizes the structures or methods described therein. Many other embodiments or combinations thereof may be apparent to those of ordinary skills in the art upon reviewing the disclosure by combining the disclosed embodiments. Other embodiments may be utilized and derived from the disclosure, such that structural and logical substitutions and changes may be made without departing from the scope of the disclosure.

Further, the disclosure and the illustrations are to be considered as illustrative rather than restrictive, and the appended claims are intended to cover all such modifications, enhancements and other embodiments, or combinations thereof, which fall within the true spirit and scope of the description. Thus, the scope of the following claims is to be determined by the broadest permissible interpretation of the claims and their equivalents, and shall not be restricted or limited by the foregoing description.

What is claimed is:

1. A method for executing, by a circuit, a bit permutation operation in which bits of an input data are mixed to obtain an output data including at least two words, the method comprising:
   generating a first mask set including mask parameters, the first mask set including one column per word of the input data, each column including a same number of occurrences of all possible values of one word of the column in relation to a size of the word of the column; and
   computing an output set including output data resulting from an application of the bit permutation operation to each data in an input set including data resulting from a combination of the input data with each mask parameter of the first mask set by Exclusive OR (XOR) operations, the first mask set being generated such that the output set includes columns of output words, each column of output words including a same number of occurrences of all possible values of one of the output words in relation to a size of the one of the output words.

2. The method of claim 1, wherein the generation of the first mask set includes:
generating a first column of the first mask set, the first column including a single occurrence of all possible values of a first word of the first column in relation to a size of the first word; and
computing each other column of the first mask set by applying a respective function to each word of the first column, the respective function being defined such that the application of the bit permutation operation to the first mask set generates a mask output set including columns of words, each column of words of the mask output set including a same number of occurrences of all possible values of one word of the column of the mask output set in relation to a size of the one word of the column of the mask output set.

3. The method of claim 2, wherein the first column of the first mask set is randomly generated.

4. The method of claim 1, wherein the bit permutation operation includes duplicating the bits of the input data.

5. The method of claim 1, further comprising performing an operation for encrypting or decrypting the input data according to a cryptographic algorithm including the bit permutation operation.

6. The method of claim 5, wherein the cryptographic algorithm conforms with a Data Encryption Standard (DES) algorithm, the bit permutation operation including a DES reverse permutation operation combined with a DES bit expansion operation.

7. The method of claim 5, wherein the cryptographic algorithm conforms with a Data Encryption Standard (DES) algorithm, the cryptographic algorithm includes, successively:
a first bit permutation operation including a DES bit expansion operation, and performed using the first mask set,
a substitution operation performed using masked substitution tables, each masked substitution table using, as an input mask, one mask parameter of the first mask set transformed by the first bit permutation operation, and as an output mask, a corresponding mask parameter of a second mask set, transformed by a second bit permutation operation, and
the second bit permutation operation which includes a DES round permutation operation, and being performed using the second mask set, the first mask set being generated such that an output set of the first bit permutation operation includes columns of words, each column of words including a same number of occurrences of all possible values of words of the output set in relation to a size of the words of the output set, the second mask set being generated such that:
when combined, by the XOR operations, with respective first masks of the first mask set, the second mask set generates a mask output set wherein each column of words of the mask output set includes a single occurrence of all possible values of a word of the column of the mask output set in relation to a size of the word of the column of the masked output set, and
an inverse of the second bit permutation operation generates an output set including columns of words, each column of words including a same number of occurrences of all possible values of one word of the column in relation to a size of the one word of the column.

8. The method of claim 7, wherein the generation of the first mask set and the second mask set includes:
computing a first column of the first mask set, the first column including a single occurrence of all possible values of a word of the first column in relation to a size of the word of the first column;
computing a first column of the second mask set by applying a first function to the first column of the first mask set;
computing each other column of the first mask set and the second mask set by applying respective second bit permutation functions to each words of the first column of the first mask set, and of the first column of the second mask set, the second bit permutation functions being defined such that:
the first bit permutation operation, applied to the first mask set, generates a first mask output set including columns of words, each column of words including a same number of occurrences of all possible values of one word of the column of words in relation to a size of the word of the column of words,
the second bit permutation operation, applied to the second mask set, generates a second mask output set including columns of words, each column of words including a same number of occurrences of all possible values of one word of the column of words in relation to with a size of the word of the column of words, and
a combination, by the XOR operations, of each column of the first mask set with a respective column of the second mask set, provides a resultant column including a single occurrence of all possible values of one word of the resultant column in relation to a size of the one word of the resultant column.

9. The method of claim 6, wherein:
an operation combining, by the XOR operations, a first round data and a second round data to provide a round output data, the operation being applied to combine each data of a first round set including the first round data, with each data of a second round set including the second round data at a same rank, the first round set and the second round set including columns of words, each column of words including a same number of occurrences of all possible values of one word of the column of words in relation to a size of the words of the column of words, and
an output set of the operation being arranged in rows and columns, each row and column including output data resulting from an application of the operation to a same one data of one of a first input set or a second input set and to all data of the other first input set or the second input set,
the method further comprising:
selecting a column of data of the output set including the round output data, the column of data including columns of output words, each column of output words including a same number of occurrences of all possible values of one output word of the column of output words in relation to a size of the output word of the column of the output words.

10. A circuit, comprising:
a processor configured to:
execute a bit permutation operation in which bits of an input data are mixed to obtain an output data comprising at least two words;
generate a first mask set including mask parameters, the first mask set including one column per word of the input data, each column including a same number of occurrences of all possible values of one word of the column in relation to a size of the word of the column; and
compute an output set including output data resulting from an application of the bit permutation operation to each data in an input set including data resulting from a combination of the input data with each mask parameter of the first mask set by Exclusive OR (XOR) operations, the first mask set being generated such that the output set includes columns of output words, each column of output words including a same number of occurrences of all possible values of one of the output words in relation to a size of the one of the output words.

11. The circuit of claim 10, wherein the generation of the first mask set includes:
generating a first column of the first mask set, the first column including a single occurrence of all possible values of a word of the first column in relation to a size of the word of the first column; and
computing each other column of the first mask set by applying a respective function to each word of the first column, the respective function being defined such that the application of the bit permutation operation to the first mask set generates a mask output set including columns of words, each column of the mask output set including a same number of occurrences of all possible values of one word of the column of the mask output set in relation to a size of the one word of the column of the mask output set.

12. The circuit of claim 11, wherein the first column of the mask set is randomly generated.

13. The circuit of claim 10, wherein the bit permutation operation includes duplicating the bits of the input data.

14. The circuit of claim 10, wherein the circuit is configured to perform an operation for encrypting or decrypting the input data according to a cryptographic algorithm including the bit permutation operation.

15. The circuit of claim 14, wherein the cryptographic algorithm conforms with a Data Encryption Standard (DES) algorithm, the bit permutation operation including a DES reverse permutation operation combined with a DES bit expansion operation.

16. The circuit of claim 14, wherein the cryptographic algorithm conforms with a Data Encryption Standard (DES) algorithm, the cryptographic algorithm includes, successively:
a first bit permutation operation including a DES bit expansion operation, and performed using the first mask set,
a substitution operation performed using masked substitution tables, each masked substitution table using as an input mask one mask parameter of the first mask set transformed by the first bit permutation operation, and as an output mask, a corresponding mask parameter of a second mask set, transformed by a second bit permutation operation, and
the second bit permutation operation which includes a DES round permutation operation, and being performed using the second mask set, the first mask set being generated such that an output set of the first bit permutation operation includes columns of words, each column of words including a same number of occurrences of all possible values of one word of the output set in relation to a size of the one word of the output set, the second mask set being generated such that:
when combined, by the XOR operations, with respective first masks of the first mask set, the second mask set generates a mask output set wherein each column of words of the output set includes a single occurrence of all possible values of a word of the column of the output set in relation to a size of the word of the column of the output set, and
an inverse of the second bit permutation operation generates an output set including columns of words, each column of words including a same number of occurrences of all possible values of one word of the output set in relation to a size of the one word of the output set.

17. The circuit of claim 16, wherein the generation of the first mask set and the second mask set comprises:
computing a first column of words of the first mask set, the first column including a single occurrence of all possible values of a word of the first column in relation to a size of the word of the first column;
computing a first column of words of the second mask set by applying a first function to the first column of the first mask set;
computing each other column of the first mask set and the second mask set by applying respective second bit permutation functions to each words of the first column of the first mask set, and of the first column of the second mask set, the second bit permutation functions being defined such that:
the first bit permutation operation, applied to the first mask set, generates a first mask output set including columns of words, each column of words including a same number of occurrences of all possible values of one word of the first mask output set column in relation to a size of the word of the first mask output set column,
the second bit permutation operation, applied to the second mask set, generates a second mask output set including columns of words, each column of words including a same number of occurrences of all possible values of one word of the column of words in relation to a size of the word of the column of words, and
a combination, by the XOR operations, of each column of the first mask set with a respective column of the second mask set, provides a resultant column including a single occurrence of all possible values of one word of the resultant column in relation to a size of the one word of the resultant column.

18. The circuit of claim 15, wherein the circuit is further configured to:
perform an operation combining, by the XOR operations, a first round data and a second round data to provide a round output data, the operation being applied to combine each data of a first round set including the first round data, with each data of a second round set including the second round data at a same rank, the first round set and the second round set including columns of words, each column of words including a same number of occurrences of all possible values of one word of the column of words in relation to a size of the one word of the columns of words, an output set of the operation being arranged in rows and columns, each row and column including output data resulting from an application of the operation to a same one data of one of a first input set or a second input set and to all data of the other first input set and or second input set; and select a column of data of the output set including the round output data, the column of data including columns of output words, each column of output words including a same number of occurrences of all possible values of one output word of the column of output words in relation to a size of the output word the column of the output words.

19. The circuit of claim 10, further comprising a circuit performing a substitution operation for each masked substitution table.

20. The circuit of claim 10, further comprising a coprocessor.

21. A device comprising a circuit according to claim 10, arranged on a card.

22. A computer program product loadable into a computer memory and comprising code portions which, when carried out by a computer, configure the computer to carry out a method for executing a bit permutation operation in which bits of an input data are mixed to obtain an output data comprising at least two words, the method comprising:

generating a first mask set including mask parameters, the first mask set including one column per word of the input data, each column including a same number of occurrences of all possible values of one word of the column in relation to a size of the word of the column; and computing an output set including output data resulting from an application of the bit permutation operation to each data in an input set including data resulting from a combination of the input data with each mask parameter of the first mask set by Exclusive OR (XOR) operations, the first mask set being generated such that the output set includes columns of output words, each column of output words including a same number of occurrences of all possible values of one of the output words in relation to a size of the one of the output words.

* * * * *